July 2, 1946.  R. L. LEVY  2,403,383
FRONT STRUT FOR TRICYCLE LANDING GEAR
Filed May 4, 1943
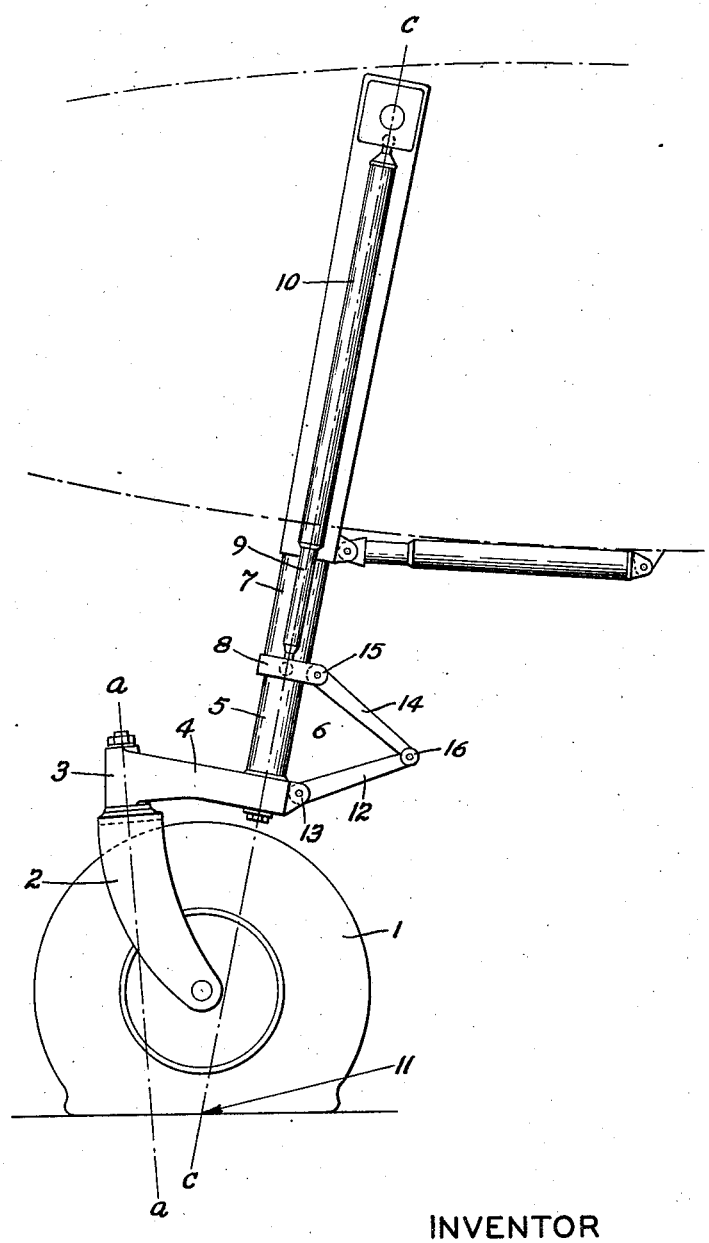
INVENTOR
R. L. LEVY
BY
ATTORNEYS

UNITED STATES PATENT OFFICE 2,403,383

FRONT STRUT FOR TRICYCLE LANDING GEARS

René Lucien Levy, Paris, France, assignor to Societe D'Inventions Aeronautiques et Mecaniques S. I. A. M., Geneva, Switzerland Application May 4, 1943, Serial No. 485,661
In France July 24, 1941

1 Claim. (Cl. 244—104)

In the tricycle landing gears known up to now, the fork of the front wheel is usually supported by a post disposed in alignment with the damping device.

The invention has for its object a front strut for tricycle landing gear, characterised in that the post supporting the fork of the wheel is pivotally mounted on a bracket integral with one of the parts of the damping device, so that the axis of the damping device passes through the contact point or the mean point of the contact surface of the wheel with the ground.

The damping device is then no longer subjected to bending stresses and it is possible to realize a gain in weight of particular interest. Moreover, the stability of the steering of the airship is increased.

In the description which follows, made by way of example, reference is made to the annexed diagrammatic drawing which is a side view of a front strut according to the invention.

The wheel 1 is mounted in a fork 2, capable of rotating about the axis a—a of a post 3. The latter is extended by a bracket 4, supporting the rod 5 of a damper 6. The body 7 of this damper is integral with a socket 8 on which are mounted the rods 9 of two dampers 10.

The combination, in a damping device, for the front strut of a tricycle landing gear, of, on one hand a damper for the suspension while travelling on the ground and, on the other hand, of two dampers for the cushioning of the shock due to the landing proper, has been described in the application for French patent filed May 14, 1941, at the Préfecture des Basses-Pyrénées, Provisional Number 888 in the name of "Constructions Mécaniques de la Vallée d'Ossau S. A. R. I." for "Improvements to landing gears."

The axis c—c of the damping device passes, according to the present invention, through the mean point 11 of the contact surface of the wheel 1 with the ground, when the airship follows a straight path. Means are provided to prohibit any angular displacement of bracket 4 around the axis of the damping device. These means comprise an arm 12 articulated at 13 on the bracket 4 and an arm 14 articulated at 15 on the socket 8, arms 12 and 14 being articulated together at 16.

The organization according to the invention reduces to a minimum the bending of the damping device, while giving the possibility to dispose this latter, in relation to the ground, according to the inclination corresponding to the best conditions of working. The strut is moreover of a good aerodynamic shape.

The front wheel may be provided with means for its setting; for the modification of direction, the group constituted by the wheel proper 1 and the fork 2 rotates around the axis a—a of the post 3. It is to be understood that the damping device is not restricted to the one above described, and may be of a classical type.

What I claim as my invention and desire to secure by Letters Patent is:

In a front strut for tricycle landing gear, a forwardly inclined main damping device including an upper relatively fixed part and a lower movable part, a bracket carried with the lower part of the damping device and extending forwardly thereof, a slightly rearwardly inclined post rotatably mounted adjacent the front end of said bracket, a rearwardly inclined fork supported by said post, a rolling member journalled in said fork, the axis of the damping device passing through the mean point of the contact surface of the rolling member with the ground, a socket carried with the lower end of the upper part of the main damping device, secondary damping devices operatively connected to the socket, and arms articulated to each other and to the socket on the main damping device and to the bracket to prevent angular displacement of the bracket around the axis of the main damping device.

RENÉ LUCIEN LEVY.